US008520075B2

(12) United States Patent
Bhagavathy et al.

(10) Patent No.: US 8,520,075 B2
(45) Date of Patent: Aug. 27, 2013

(54) METHOD AND APPARATUS FOR REDUCED REFERENCE VIDEO QUALITY MEASUREMENT

(75) Inventors: Sitaram Bhagavathy, Plainsboro, NJ (US); Jeffrey A Bloom, West Windsor, NJ (US); Dekun Zou, West Windsor, NJ (US); Ran Ding, Eatontown, NJ (US); Beibei Wang, Morganville, NJ (US); Tao Liu, Eatontown, NJ (US); Niranjan Narvekar, Long Branch, NJ (US)

(73) Assignee: Dialogic Inc., Parsippany, NJ (US)

( * ) Notice: Subject to any disclaimer, the term of this patent is extended or adjusted under 35 U.S.C. 154(b) by 130 days.

(21) Appl. No.: 13/151,761

(22) Filed: Jun. 2, 2011

(65) Prior Publication Data
US 2012/0307074 A1    Dec. 6, 2012

(51) Int. Cl.
    *H04N 17/00*        (2006.01)
(52) U.S. Cl.
    USPC ................... 348/180; 348/189; 348/192
(58) Field of Classification Search
    USPC ......... 348/192, 180–184, 189, 190, 193–194, 348/518, 519; 455/67.1, 67.3, 67.7, 69; 382/293–295, 279
    IPC ....................................................... H04N 17/00
    See application file for complete search history.

(56) References Cited

U.S. PATENT DOCUMENTS

| 5,446,492 | A  | * | 8/1995  | Wolf et al.     | 348/192 |
| 6,496,221 | B1 | * | 12/2002 | Wolf et al.     | 348/192 |
| 7,668,397 | B2 | * | 2/2010  | Le Dinh et al.  | 382/275 |
| 7,705,881 | B2 | * | 4/2010  | Okamoto et al.  | 348/180 |

OTHER PUBLICATIONS

P. Marziliano, F. Dufaux, S. Winkler, and T. Ebrahimi, "A no-reference perceptual blur metric," in Proceedings of the International Conference on Image Processing, vol. 3, Sep. 2002, pp. 57-60.
R. Muijs and I. Kirenko, "A no-reference blocking artifact measure for adaptive video processing," European Signal Processing Conference (EUSIPCO'2005), Antalya, Turkey, Sep. 2005.
C. Chen, W. Chen, and J. Bloom, "A Universal and Reference-Free Blurriness Measure," SPIE Electronic Imaging, Image Quality and System Performance VIII (EI106), San Francisco, CA, Jan. 23-27, 2011.
M. Carnec, P. Le Callet, and D. Barba, "An image quality assessment method based on perception of structural information," IEEE International Conference on Image Processing (ICIP), Sep. 2003.
M. Carnec, P. Le Callet, and D. Barba, "Visual features for image quality assessment with reduced reference," IEEE International Conference on Image Processing (ICIP), Sep. 2005.

(Continued)

*Primary Examiner* — Trang U Tran (57) ABSTRACT

Systems and methods of objective video quality measurement that employ a reduced-reference approach to video quality measurement. Such systems and methods of objective video quality measurement can extract information pertaining to one or more features of a target video whose perceptual quality is to be measured, extract information pertaining to one or more features of a reference video, and employ one or more prediction functions involving the target features and the reference features to provide a measurement of the perceptual quality of the target video.

33 Claims, 4 Drawing Sheets

(56) References Cited

OTHER PUBLICATIONS

I. P. Gunawan and M. Ghanbari, "Reduced reference picture quality estimation by using local harmonic amplitude information," in Proceedings of the London Commununication Symposium, Sep. 2003, pp. 137-140.

I. P. Gunawan and M. Ghanbari, "Image quality assessment based on harmonics gain/loss information," IEEE International Conference on Image Processing (ICIP), Sep. 2005.

Z. Wang and E. P. Simoncelli, "Reduced-reference image quality assessment using a wavelet-domain natural image statistic model," Human Vision and Electronic Imaging X, Proceedings of the SPIE, vol. 5666, Jan. 2005.

Z. Wang, G. Wu, H. R. Sheikh, E. P. Simoncelli, E.-H. Yang and A. C. Bovik, "Quality-aware images," IEEE Transactions on Image Processing, vol. 15, No. 6, pp. 1680-1689, Jun. 2006.

Q. Li and Z. Wang, "Reduced-reference image quality assessment using divisive normalization-based image representation," IEEE Journal of Selected Topics in Signal Processing, Special issue on Visual Media Quality Assessment, vol. 3, No. 2, pp. 202-211, Apr. 2009.

A. Rehman and Z. Wang, "Reduced-Reference SSIM estimation," IEEE International Conference on Image Processing (ICIP), Sep. 2010.

Z. Wang, A. C. Bovik, H. R. Sheikh, and E. P. Simoncelli, "Image quality assessment: From error visibility to structural similarity," IEEE Transactions on Image Processing, vol. 13, No. 4, Apr. 2004, pp. 600-612.

C. S. Won, "Image fidelity assessment using the edge histogram descriptor of MPEG-7," ETRI Journal, vol. 29, No. 5, pp. 703-705, 2007.

U. Engelke, M. Kusuma, H.-J. Zepernick, and M. Caldera, "Reduced-reference metric design for objective perceptual quality assessment in wireless imaging," Signal Processing: Image Communication, vol. 24, No. 7, Aug. 2009, pp. 525-547.

X. Lv and Z. J. Wang, "Reduced-reference image quality assessment based on perceptual image hashing," IEEE International Conference on Image Processing (ICIP), Nov. 2009.

J. You, U. Reiter, M. M. Hannuksela, M. Gabbouj, and A. Perkis, "Perceptual-based quality assessment for audio-visual services: A survey," Signal Processing: Image Communication, vol. 25, No. 7, Special Issue on Image and Video Quality Assessment, Aug. 2010, pp. 482-501.

VQEG, "Final report from the Video Quality Experts Group on the validation of reduced-reference and no-reference objective models for standard definition television, Phase I," Jun. 2009, available at http://www.vqeg.org.

ITU-T Recommendation J.246, "Perceptual visual quality measurement techniques for multimedia services over digital cable television networks in the presence of a reduced bandwidth reference," International Telecommunication Union, Geneva, Switzerland, 2008.

S. Winkler, "Video quality measurement standards—Current status and trends," International Conference on Information, Communications and Signal Processing (ICICS), Dec. 2009, pp. 1-5.

S. Wolf and M. Pinson, "Video quality measurement techniques," National Telecommunications and Information Administration (NTIA) Report, TR-02-392, Jun. 2002.

S. Wolf and M. Pinson, "Low bandwidth reduced reference video quality monitoring system," International Workshop on Video Processing and Quality Metrics for Consumer Electronics, Jan. 2005.

J. You, M. Hannuksela, and M. Gabbouj, "An objective video quality metric based on spatiotemporal distortion," IEEE International Conference on Image Processing (ICIP), Nov. 2009, pp. 2229-2232.

J. You, A. Perkis, M. M. Hannuksela, and M. Gabbouj, "Perceptual quality assessment based on visual attention analysis," ACM International Conference on Multimedia, Oct. 2009, pp. 561-564.

I. P. Gunawan and M. Ghanbari, "Reduced-reference video quality assessment using discriminative local harmonic strength with motion consideration," IEEE Transactions on Circuits and Systems for Video Technology, vol. 18, No. 1, Jan. 2008, pp. 71-83.

I. P. Gunawan and M. Ghanbari, "An efficient reduced-reference video quality metric," Picture Coding Symposium (PCS), Nov. 2007.

B. Hiremath, Q. Li, and Z. Wang, "Quality-aware video," IEEE International Conference on Image Processing (ICIP), Sep. 2007.

A. Albonico, G. Valenzise, M. Naccari, M. Tagliasacchi, and S. Tubaro, "A reduced-reference video structural similarity metric based on no-reference estimation of channel-induced distortion," IEEE International Conference on Acoustics, Speech, and Signal Processing (ICASSP), 2009, pp. 1857-1860.

Z. Wang, L. Lu, and A. C. Bovik, "Video quality assessment based on structural distortion measurement," Signal Processing: Image Communication, vol. 19, No. 2, Feb. 2004, pp. 121-132.

R. Streijl, S. Winkler, and D. Hands, "Perceptual quality measurement: Towards a more efficient process for validating objective models [Standards in a nutshell]," IEEE Signal Processing Magazine, vol. 27, No. 4, pp. 136-140, Jul. 2010.

Z. Lu, W. Lin, B. C. Seng, S. Kato, S. Yao, E. Ong, and X. K. Yang, "Measuring the Negative Impact of Frame Dropping on Perceptual Visual Quality", in Proc. SPIE Human Vision and Electronic Imaging, vol. 5666, Jan. 2005, pp. 554-562.

G. Zhai, J. Cai, W. Lin, X. Yang, W. Zhang, "Three Dimentional Scalable Video Adaptation via User-end Perceptual Quality Assessment", Broadcasting, IEEE Transactions on, Sep. 2008, vol. 54, issue 3, p. 719-727.

T. Yamada, Y. Miyamoto, Y. Senda, and M. Serizawa, "Video-quality estimation based on reduced-reference model employing activity-difference," IEICE Transactions on Fundamentals of Electronics, Communications and Computer Sciences, vol. E92-A, No. 12, Dec. 2009, pp. 3284-3290.

P. Le Callet, C. Viard-Gaudin, S. Pechard, and E. Caillault, "No reference and reduced reference video quality metrics for end to end QoS monitoring," IEICE Transactions on Communications, vol. E89-B, No. 2, 2006, pp. 289-296.

Tobias Oelbaum and Klaus Diepold, "Building a Reduced Reference Video Quality Metric with Very Low Overhead using Multivariate Data Analysis," Proceedings of the 4th International Conference on Cybernetics and Information Technologies, Systems and Applications (CITSA '07), 2007.

Y-F Ou, Z. Ma, T. Liu and Y. Wang, "Perceptual quality assessment of video considering both frame rate and quantization artifacts", IEEE Trans. Circuit and Sys. for Video Technology, vol. 21, No. 3, Mar. 2011, pp. 286-298.

D. O. Kim, R.-H. Park, and D. G. Sim, "Reduced reference image quality assessment based on similarity of edge projections," available online at http://citeseerx.ist.psu.edu/viewdoc/summary?doi=10.1.1.103.770, 2008.

U. Engelke, "Perceptual Quality Metric Design for Wireless Image and Video Communication," Blekinge Institute of Technology, Licentiate Dissertation Series No. 2008:08, 2008.

* cited by examiner

METHOD AND APPARATUS FOR REDUCED REFERENCE VIDEO QUALITY MEASUREMENT

CROSS REFERENCE TO RELATED APPLICATIONS

—Not applicable—

STATEMENT REGARDING FEDERALLY SPONSORED RESEARCH OR DEVELOPMENT

—Not applicable—

FIELD OF THE INVENTION

The present application relates generally to systems and methods of objective video quality measurement, and more specifically to systems and methods of objective video quality measurement that employ a reduced-reference approach.

BACKGROUND OF THE INVENTION

Systems and methods are known that employ a full-reference approach, a no-reference approach, and a reduced-reference approach to video quality measurement. For example, systems that employ a full-reference approach to video quality measurement typically receive target video content (also referred to herein as a/the "target video") whose perceptual quality is to be measured, and compare information from the target video to corresponding information from a reference version (also referred to herein as a/the "reference video") of the target video to provide a measurement of the perceptual quality of the target video. In such systems that employ a full-reference approach to video quality measurement, it is generally assumed that the systems have full access to all of the information from the reference video for comparison to the target video information. However, transmitting all of the information from the reference video over a network for comparison to the target video information at an endpoint device, such as a mobile phone, can consume an undesirably excessive amount of network bandwidth. Such a full-reference approach to video quality measurement is therefore generally considered to be impractical for use in measuring the perceptual quality of a target video at such an endpoint device.

In systems that employ a no-reference approach to video quality measurement, it is generally assumed that no information from any reference video is available to the systems for comparison to the target video information. Such systems that employ a no-reference approach to video quality measurement therefore typically provide measurements of the perceptual quality of the target video using only information from the target video. However, such systems that employ a no-reference approach to video quality measurement may be inaccurate, since certain assumptions made for the purpose of measuring the perceptual quality of the target video may be inaccurate.

Systems that employ a reduced-reference approach to video quality measurement typically have access to a reduced amount of information from the reference video for comparison to the target video information. For example, such information from the reference video can include a limited number of characteristics of the reference video, such as its spectral components, its variation of energy level, and/or its energy distribution in the frequency domain, each of which may be sensitive to degradation during processing and/or transmission of the target video. However, such known systems that employ a reduced-reference approach to video quality measurement can also be impractical for use in measuring the perceptual quality of a target video following its transmission over a network to an endpoint device, such as a mobile phone, due at least in part to constraints in the network bandwidth, and/or because of the limited processing power that is typically available in the endpoint device to perform the video quality measurement.

It would therefore be desirable to have improved systems and methods of objective video quality measurement that avoid at least some of the drawbacks of the various known video quality measurement systems and methods described above.

BRIEF SUMMARY OF THE INVENTION

In accordance with the present application, systems and methods of objective video quality measurement are disclosed that employ a reduced-reference approach. Such systems and methods of objective video quality measurement can extract information pertaining to one or more features (also referred to herein as "target features") of a target video whose perceptual quality is to be measured, extract corresponding information pertaining to one or more features (also referred to herein as "reference features") of a reference video, and employ one or more prediction functions involving the target features and the reference features to provide a measurement of the perceptual quality of the target video.

In accordance with a first aspect, a system for measuring the perceptual quality of a target video that employs a reduced-reference approach to video quality measurement comprises a plurality of functional components, including a target feature extractor, a reference feature extractor, and a quality assessor. The target feature extractor is operative to extract one or more target features from the target video by performing one or more objective measurements with regard to the target video. Similarly, the reference feature extractor is operative to extract one or more reference features from the reference video by performing one or more objective measurements with regard to the reference video. Such objective measurements performed on the target video and the reference video can include objective measurements of blocking artifacts in the respective target and reference videos (also referred to herein as "blockiness measurements"), objective measurements of blur in the respective target and reference videos (also referred to herein as "blurriness measurements"), objective measurements of an average quantization index for the respective target and reference videos, as examples, and/or any other suitable types of objective measurements. Such objective measurements can result in target features and reference features that can be represented by compact data sets, which may be transmitted over a network without consuming an undesirably excessive amount of network bandwidth. As employed herein, the term "quantization index" (also referred to herein as a/the "QI") corresponds to any suitable parameter that can be adjusted to control the quantization step-size used by a video encoder. For example, such a QI can correspond to a quantization parameter (also referred to herein as a/the "QP") for video bitstreams compressed according to the H.264 coding format, a quantization scale for video bitstreams compressed according to the MPEG-2 coding format, or any other suitable parameter for video bitstreams compressed according to any other suitable coding format. The quality assessor is operative to provide an assessment of the perceptual quality of the target video following its transmission over the network to an endpoint device, using one or more prediction functions involving the target features and the reference features. In accordance with an exemplary aspect, one or more of the prediction functions can be linear prediction functions or non-linear prediction functions. For example, such an endpoint device can be a mobile phone, a mobile or non-mobile computer, a tablet computer, or any other suitable type of mobile or non-mobile endpoint device capable of displaying video.

In accordance with another exemplary aspect, the perceptual quality of each of the target video and the reference video can be represented by a quality assessment score, such as a predicted mean opinion score (MOS). In accordance with such an exemplary aspect, the quality assessor is operative to estimate the perceptual quality of the target video by obtaining a difference between an estimate of the perceptual quality of the reference video, and an estimate of the predicted differential MOS (also referred to herein as a/the "DMOS") between at least a portion of the reference video and at least a portion of the target video. For example, the estimate of the perceptual quality of the target video (also referred to herein as a/the "$\hat{Q}_{tar}$") can be expressed as $$\hat{Q}_{tar} = \hat{Q}_{ref} - \overline{\Delta Q},$$

in which "$\hat{Q}_{ref}$" corresponds to the estimate of the perceptual quality of the reference video, and "$\overline{\Delta Q}$" corresponds to the estimate of the DMOS between the reference video and the target video. It is noted that the DMOS between the reference video and the target video can be expressed as follows, $$\Delta Q = (Q_{ref} - Q_{tar}).$$

The quality assessor is further operative to calculate or otherwise determine the $\hat{Q}_{ref}$ using a first prediction function for a predetermined segment from a corresponding time frame within the reference video and the target video. For example, the $\hat{Q}_{ref}$ can be expressed as $$\hat{Q}_{ref} = f_1(QI_{ref}),$$

in which "$f_1(QI_{ref})$" corresponds to the first prediction function, and "$QI_{ref}$" corresponds to the QI for the reference video. For example, the first prediction function, $f_1(QI_{ref})$, can be a linear function of the QI for the reference video, and/or any other suitable reference feature(s). The quality assessor is also operative to calculate or otherwise determine the $\overline{\Delta Q}$ using a second prediction function for the predetermined segment. For example, the $\overline{\Delta Q}$ can be expressed as $$\overline{\Delta Q} = f_2(\Delta blr, \Delta blk),$$

in which "$f_2(\Delta blr, \Delta blk)$" corresponds to the second prediction function, "$\Delta blr$" corresponds to the average change in frame-wise blurriness measurements between the reference video and the target video for the predetermined segment, and "$\Delta blk$" corresponds to the average change in frame-wise blockiness measurements between the reference video and the target video for the predetermined segment. For example, the second prediction function, $f_2(\Delta blr, \Delta blk)$, can be a linear function of the average change in the frame-wise blurriness measurements for the respective target and reference videos, the average change in the frame-wise blockiness measurements for the respective target and reference videos, and/or any other suitable reference feature(s) and target feature(s).

In accordance with a further exemplary aspect, the quality assessor is operative to estimate the perceptual quality of the target video, $\hat{Q}_{tar}$, using a third prediction function based on the first prediction function, $f_1(QI_{ref})$, and the second prediction function, $f_2(\Delta blr, \Delta blk)$. For example, the $\hat{Q}_{tar}$ can be expressed as $$\hat{Q}_{tar} = f_3(QI_{ref}, \Delta blr, \Delta blk) = a_3 \cdot QI_{ref} + b_3 \cdot \Delta blr + c_3 \cdot \Delta blk + d_3,$$

in which "$f_3(QI_{ref}, \Delta blr, \Delta blk)$" corresponds to the third prediction function, and "$a_3$," "$b_3$," "$c_3$," and "$d_3$" each correspond to a parameter coefficient of the third prediction function. For example, the value of each of the parameter coefficients $a_3$, $b_3$, $c_3$, and $d_3$ can be determined using a multi-variate linear regression approach, based on a plurality of predetermined target video bitstreams and their corresponding reference video bitstreams, and ground truth quality values, or any other suitable technique.

In accordance with another aspect of the disclosed systems and methods, the target feature extractor, the reference feature extractor, and the quality assessor can be implemented in a distributed fashion within a video communications environment. In accordance with an exemplary aspect, the target feature extractor can be located proximate to or co-located with the quality assessor, such as within the endpoint device, and the reference feature extractor can be disposed at a distal or geographically remote location from the target feature extractor and the quality assessor. In accordance with such an exemplary aspect, the disclosed system can transmit the reference features from the reference feature extractor at the distal or geographically remote location to the quality assessor, which, in turn, can access the target features from the target feature extractor proximate thereto or co-located therewith for estimating the perceptual quality of the target video. In accordance with another exemplary aspect, the reference feature extractor can be located proximate to or co-located with the quality assessor, and the target feature extractor can be disposed at a distal or geographically remote location from the reference feature extractor and the quality assessor. In accordance with such an exemplary aspect, the disclosed system can transmit the target features from the target feature extractor at the distal or geographically remote location to the quality assessor, which, in turn, can access the reference features from the reference feature extractor proximate thereto or co-located therewith for estimating the perceptual quality of the target video. In accordance with a further exemplary aspect, the quality assessor may be disposed at a centralized location that is geographically remote from the target feature extractor and the reference feature extractor. In accordance with such an exemplary aspect, the disclosed system can transmit the target features from the target feature extractor to the quality assessor, and transmit the reference features from the reference feature extractor to the quality assessor, for estimating the perceptual quality of the target video within the quality assessor at the geographically remote, centralized location.

By extracting reference features and target features from a reference video and a target video, respectively, and representing the respective reference and target features as compact data sets, the disclosed systems and methods can operate to transmit the reference features and/or the target features over a network to a quality assessor for assessing the perceptual quality of the target video, without consuming an undesirably excessive amount of network bandwidth. Further, by providing for such a perceptual quality assessment of the target video using one or more prediction functions, the perceptual quality assessment of the target video can be performed within an endpoint device having limited processing power. Moreover, by using the average values of frame-wise objective measurements for a predetermined segment from a corresponding time frame within the reference video and the target video, fluctuations in the perceptual quality assessment of the target video can be reduced.

Other features, functions, and aspects of the invention will be evident from the Drawings and/or the Detailed Description of the Invention that follow.

BRIEF DESCRIPTION OF THE SEVERAL VIEWS OF THE DRAWINGS

The invention will be more fully understood with reference to the following Detailed Description of the Invention in conjunction with the drawings of which.

DETAILED DESCRIPTION OF THE INVENTION

Systems and methods of objective video quality measurement are disclosed that employ a reduced-reference approach. Such systems and methods of objective video quality measurement can extract information pertaining to one or more features (also referred to herein as "target features") of a target video whose perceptual quality is to be measured, extract corresponding information pertaining to one or more features (also referred to herein as "reference features") of a reference video, and employ one or more prediction functions involving the target features and the reference features to provide a measurement of the perceptual quality of the target video.

Figure 1:
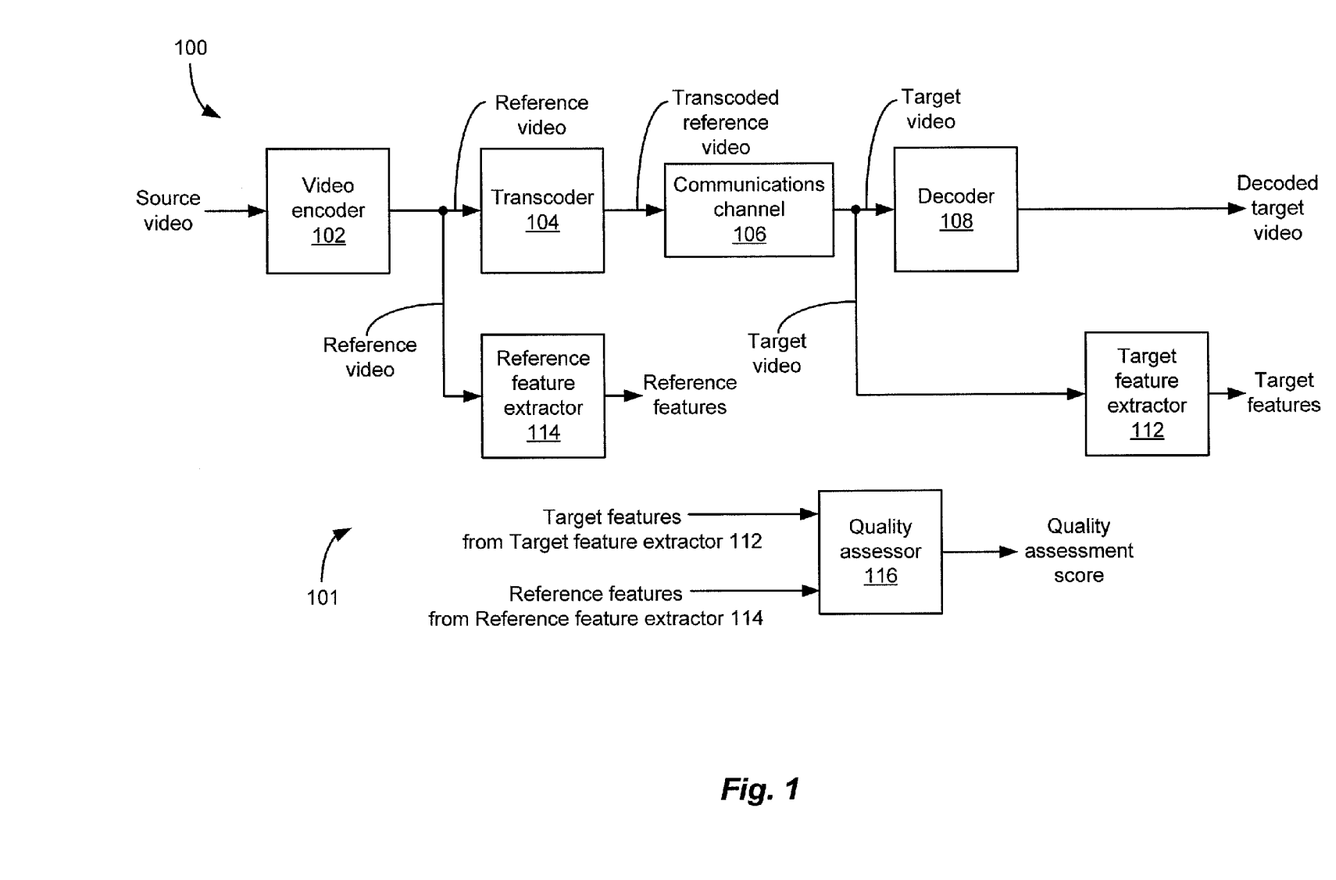
FIG. 1 is a block diagram of an exemplary video communications environment, in which an exemplary system for measuring the perceptual quality of a target video employing a reduced-reference approach to video quality measurement can be implemented, in accordance with an exemplary embodiment of the present application.

FIG. 1 depicts an exemplary video communications environment 100, in which an exemplary system 101 (also referred to herein as a/the "video quality measurement system") for measuring the perceptual quality of a target video employing a reduced-reference approach to video quality measurement can be implemented, in accordance with the present application. As shown in FIG. 1, the exemplary video communications environment 100 includes a video encoder 102, a video transcoder 104, at least one communications channel 106, and a video decoder 108. The video encoder 102 is operative to generate a reference version (also referred to herein as a/the "reference video") of target video content (also referred to herein as a/the "target video") from a source video sequence (also referred to herein as a/the "source video"), and to provide the reference video, compressed according to a first predetermined coding format, to the video transcoder 104. For example, the source video can include a plurality of video frames such as YUV video frames, or any other suitable type of video frames. Further, the source video may include, by way of non-limiting example, one or more of television video, music video, performance video, webcam video, surveillance video, security video, unmanned aerial vehicle (UAV) video, teleconferencing video, or any other suitable type of video. The video transcoder 104 is operative to transcode the reference video into a transcoded version of the reference video (also referred to herein as a/the "transcoded reference video"), which is compressed according to a second predetermined coding format that is supported by the communications channel 106. By way of non-limiting example, the first and second predetermined coding formats of the reference video and the transcoded reference video, respectively, may be selected from the H.263 coding format, the H.264 coding format, the MPEG-2 coding format, the MPEG-4 coding format, and/or any other suitable coding format(s). The video transcoder 104 is further operative to provide the transcoded reference video for transmission over the communications channel 106, which, for example, can be wire-based, optical fiber-based, wireless, or any suitable combination thereof. Following its transmission over the communications channel 106, the transcoded reference video is referred to herein as the target video. The video decoder 108 is operative to receive the target video, and to decode the target video, thereby generating a decoded version of the target video (also referred to herein as a/the "decoded target video").

It is noted that one or more types of degradation may be introduced into the source video during its processing within the video encoder 102 to generate the reference video. One or more types of degradation may also be introduced into the reference video during its processing within the video transcoder 104, and/or its transmission over the communication channel 106. By way of non-limiting example, such degradation of the source video and/or the reference video may be due to image rotation, additive noise, low-pass filtering, compression losses, transmission losses, and/or any other possible type of degradation. For example, the perceptual quality of each of the source video, the reference video, and the target video can be represented by a predicted mean opinion score (MOS), or any other suitable type of quality assessment score. It is noted that the perceptual quality of the reference video can be represented by a predetermined constant value. It is further noted that the source video is assumed to have the highest perceptual quality in comparison to the reference video and the target video.

FIG. 1 further depicts an illustrative embodiment of the exemplary video quality measurement system 101 within the video communications environment 100. As shown in FIG. 1, the video quality measurement system 101 includes a plurality of functional components that can be implemented in a distributed fashion within the video communications environment 100. The plurality of functional components include a target feature extractor 112, a reference feature extractor 114, and a quality assessor 116. The target feature extractor 112 is operative to extract one or more target features from the target video by performing one or more objective measurements with regard to the target video. Similarly, the reference feature extractor 114 is operative to extract one or more reference features from the reference video by performing one or more objective measurements with regard to the reference video. For example, such objective measurements performed with regard to the target video and the reference video can involve one or more spatial quality factors and/or temporal quality factors, and can include objective measurements of blocking artifacts in the respective target and reference videos (also referred to herein as "blockiness measurements"), objective measurements of blur in the respective target and reference videos (also referred to herein as "blurriness measurements"), objective measurements of an average quantization index for the respective target and reference videos, and/or any other suitable types of objective measurements performed with regard to the respective target and reference videos.

It is noted that such objective measurements performed with regard to the respective target and reference videos can result in target features and reference features that can be represented by compact data sets, which may be transmitted over a network without consuming an undesirably excessive amount of network bandwidth. It is further noted that the term "quantization index" (also referred to herein as a/the "QI"), as employed herein, corresponds to any suitable parameter that can be adjusted to control the quantization step-size used by a video encoder, such as the video encoder 102, or a video encoder (not shown) within the video transcoder 104. For example, such a QI can correspond to a quantization parameter (also referred to herein as a/the "QP") for a video bitstream compressed according to the H.264 coding format, a quantization scale for a video bitstream compressed according to the MPEG-2 coding format, or any other suitable parameter for a video bitstream compressed according to any other suitable coding format.

The quality assessor 116 is operative to provide an assessment of the perceptual quality of the target video, after its having been processed and transmitted within the video communications environment 100, using one or more prediction functions involving the target features and the reference features. For example, one or more of the prediction functions can be linear prediction functions or non-linear prediction functions. In accordance with the illustrative embodiment of FIG. 1, the quality assessor 116 is operative to estimate the perceptual quality of the target video by obtaining a difference between an estimate of the perceptual quality of the reference video, and an estimate of the predicted differential MOS (also referred to herein as a/the "DMOS") between at least a portion of the reference video and at least a portion of the target video. For example, the estimate of the perceptual quality of the target video (also referred to herein as a/the "$\hat{Q}_{tar}$") can be expressed as $$\hat{Q}_{tar} = \hat{Q}_{ref} - \overline{\Delta Q}, \tag{1a}$$

in which "$\hat{Q}_{ref}$" corresponds to the estimate of the perceptual quality of the reference video, and "$\overline{\Delta Q}$" corresponds to the estimate of the DMOS between the reference video and the target video. It is noted that the DMOS between the reference video and the target video can be expressed as follows, $$\Delta Q = (Q_{ref} - Q_{tar}). \tag{1b}$$

The quality assessor 116 is further operative to calculate or otherwise determine the $\hat{Q}_{ref}$ using a first prediction function for a predetermined segment from a corresponding time frame within the reference video and the target video. For example, such a predetermined segment can have a duration of about 5 seconds, or any other suitable duration.

Moreover, the $\hat{Q}_{ref}$ can be expressed as $$\hat{Q}_{ref} = f_1(QI_{ref}), \tag{2}$$

in which "$f_1(QI_{ref})$" corresponds to the first prediction function, and "$QI_{ref}$" corresponds to the QI for the reference video. For example, the first prediction function, $f_1(QI_{ref})$, can be a linear function of the QI for the reference video, and/or any other suitable reference feature(s). The quality assessor 116 is further operative to calculate or otherwise determine the $\overline{\Delta Q}$ using a second prediction function for the predetermined segment. For example, the $\overline{\Delta Q}$ can be expressed as $$\overline{\Delta Q} = f_2(\Delta blr, \Delta blk), \tag{3}$$

in which "$f_2(\Delta blr, \Delta blk)$" corresponds to the second prediction function, "$\Delta blr$" corresponds to the average change in the blurriness measurements between the reference video and the target video for the predetermined segment, and "$\Delta blk$" corresponds to the average change in the blockiness measurements between the reference video and the target video for the predetermined segment.

For example, the second prediction function, $f_2(\Delta blr, \Delta blk)$, can be a linear function of the average change in the blurriness measurements for the respective target and reference videos, the average change in the blockiness measurements for the respective target and reference videos, and/or any other suitable reference feature(s) and target feature(s). Such blurriness measurements for the respective target and reference videos can be performed using any suitable technique, such as the techniques described in U.S. patent application Ser. No. 12/706,165, filed Feb. 16, 2010, entitled UNIVERSAL BLURRINESS MEASUREMENT APPROACH FOR DIGITAL IMAGERY, which is assigned to the same assignee of the present application, and which is hereby incorporated herein by reference in its entirety. Further, such blockiness measurements for the respective target and reference videos can be performed using any suitable technique, such as the techniques described in U.S. patent application Ser. No. 12/757,389, filed Apr. 9, 2010, entitled BLIND BLOCKING ARTIFACT MEASUREMENT APPROACHES FOR DIGITAL IMAGERY, which is assigned to the same assignee of the present application, and which is hereby incorporated herein by reference in its entirety.

In accordance with the illustrative embodiment of FIG. 1, the quality assessor 116 is operative, for each predetermined segment from a corresponding time frame within the reference video and the target video, to perform blurriness measurements in a frame-wise fashion, and to take the average of the frame-wise blurriness measurements to obtain the average blurriness measurements, $blr_{ref}$ and $blr_{tar}$, for the reference video and the target video, respectively. To obtain the average change, $\Delta blr$, in the blurriness measurements for the reference video and the target video, the quality assessor 116 is further operative to take the difference between the average blurriness measurements, $blr_{ref}$ and $blr_{tar}$, as follows, $$\Delta blr = blr_{ref} - blr_{tar}. \tag{4}$$

Similarly, to obtain the average change, $\Delta blk$, in the blockiness measurements for the reference video and the target video, the quality assessor 116 is operative, for each predetermined segment from a corresponding time frame within the reference video and the target video, to perform blockiness measurements in a frame-wise fashion, and to take the average of the frame-wise blockiness measurements to obtain the average blockiness measurements, $blk_{ref}$ and $blk_{tar}$, for the reference video and the target video, respectively. The quality assessor 116 is further operative to take the difference between the average blockiness measurements, $blk_{ref}$ and $blk_{tar}$, as follows, $$\Delta blk = blk_{ref} - blk_{tar}. \tag{5}$$

In further accordance with the illustrative embodiment of FIG. 1, the quality assessor 116 is operative, at least for some types of objective measurements, to normalize the averaged objective measurements for the predetermined segment from the corresponding time frame within the reference video and the target video, before taking the difference between the averaged objective measurements. Such normalization can be performed to reflect any differences in resolution between the reference video and the target video. For example, the blurriness measurements for the reference video and the target video can each provide a measure in pixels of the spread of an edge of a video frame, or a measure of the change in gradient between adjacent pixels. Because such measures are typically resolution-dependent, the quality assessor 116 can normalize each of the average blurriness measurements, $blr_{ref}$ and $blr_{tar}$, before taking the difference between the average measurements $blr_{ref}$ and $blr_{tar}$, as follows, $$\Delta blr = \frac{blr_{ref}}{w_{ref}} - \frac{blr_{tar}}{w_{tar}}, \quad (6)$$

in which "$w_{ref}$" is the width of each video frame in the predetermined segment corresponding to the reference video, and "$w_{tar}$" is the width of each video frame in the predetermined segment corresponding to the target video.

Moreover, to obtain the $QI_{ref}$, the quality assessor 116 is further operative, for each predetermined segment from a corresponding time frame within the reference video and the target video, to obtain the QI in a frame-wise fashion, and to take the average of the frame-wise QIs to obtain the $QI_{ref}$ for the reference video. For example, each frame-wise QI can be determined by taking the average of the QIs for all of the coded macroblocks in a corresponding video frame.

In further accordance with the illustrative embodiment of FIG. 1, the quality assessor 116 is operative to estimate the perceptual quality of the target video, $\hat{Q}_{tar}$, using a third prediction function based on the first prediction function, $f_1(QI_{ref})$ (see equation (2) above), and the second prediction function, $f_2(\Delta blr, \Delta blk)$ (see equation (3) above). For example, the $\hat{Q}_{tar}$ can be expressed as $$\hat{Q}_{tar} = f_3(QI_{ref}, \Delta blr, \Delta blk) = a_3 \cdot QI_{ref} + b_3 \cdot \Delta blr + c_3 \cdot \Delta blk + d_3, \quad (7)$$

in which "$f_3(QI_{ref}, \Delta blr, \Delta blk)$" corresponds to the third prediction function, and "$a_3$," "$b_3$," "$c_3$," and "$d_3$" each correspond to a parameter coefficient of the third prediction function. It is noted that the value of each of the parameter coefficients $a_3$, $b_3$, $c_3$, and $d_3$ can be determined using a multi-variate linear regression approach, based on a plurality of predetermined target video bitstreams and their corresponding reference video bitstreams, and ground truth quality values, or any other suitable technique.

By way of example, one such technique for determining the parameter coefficients, $a_3$, $b_3$, $c_3$, and $d_3$, includes, for a large number (e.g., greater than about 500) of predetermined segments, collecting the corresponding ground truth quality values and objective feature values for $QI_{ref}$, $\Delta blr$, and $\Delta blk$. A matrix, X, can then be formed, as follows, $$X = [QI_{ref}|\Delta blr|\Delta blk|1], \quad (8)$$

in which "$QI_{ref}$" is a vector of all of the corresponding $QI_{ref}$ values, "$\Delta blr$" is a vector of all of the corresponding $\Delta blr$ values, "$\Delta blk$" is a vector of all of the corresponding $\Delta blk$ values, "1" is a vector of 1s, and "|" indicates column-wise concatenation of the vectors, $QI_{ref}$, $\Delta blr$, $\Delta blk$, and 1. Next, a vector, y, of all of the ground truth quality values can be formed, and can be related to the matrix, X, as follows, $$y = Xp, \quad (9)$$

in which "p" is a parameter vector, which can be expressed as $$p = (a_3, b_3, c_3, d_3)^T. \quad (10)$$

For example, the parameter vector, p, can be determined using a least-squares linear regression approach, as follows, $$p = (X^T X)^{-1} X^T y. \quad (11)$$

In this way, exemplary values for the parameter coefficients, $a_3$, $b_3$, $c_3$, and $d_3$, can be determined to be equal to about 0.025, 0.19, 1.85, and 4.28, respectively, or any other suitable values.

Figure 2A:
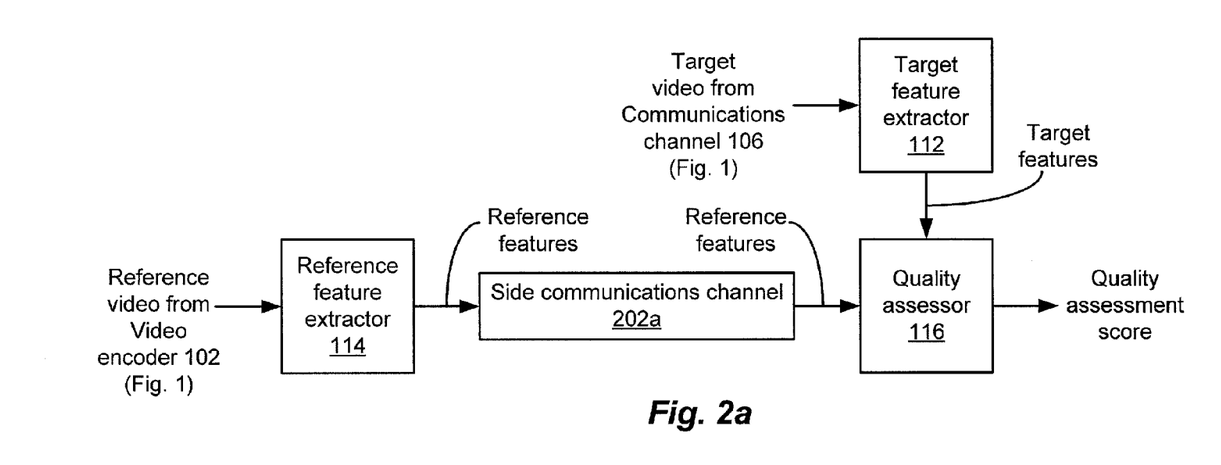
FIG. 2a is a block diagram of an exemplary target feature extractor, an exemplary reference feature extractor, and an exemplary quality assessor included within the system of FIG. 1, illustrating an exemplary method of providing target features and reference features from the target feature extractor and the reference feature extractor, respectively, to the quality assessor.
Figure 2B:
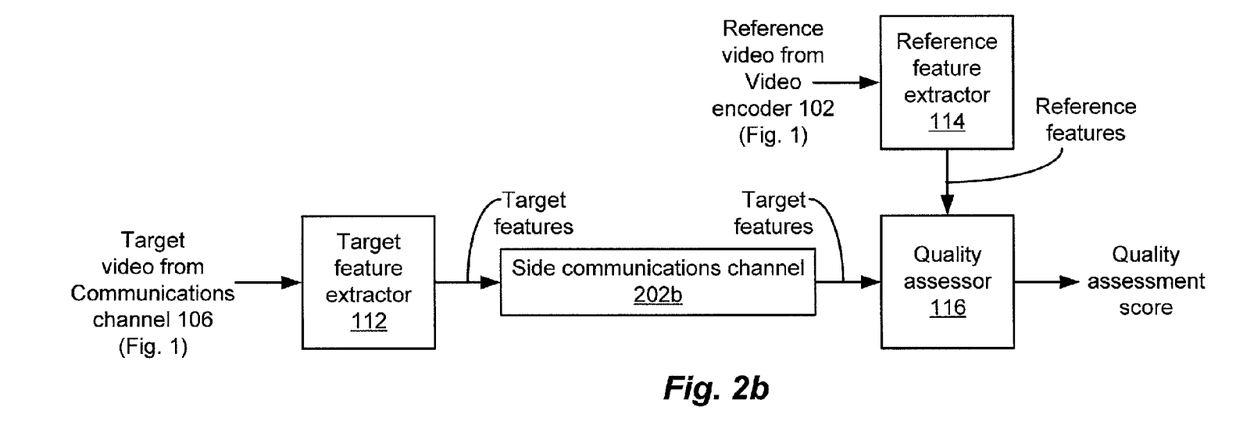
FIG. 2b is a block diagram of the exemplary target feature extractor, the exemplary reference feature extractor, and the exemplary quality assessor included within the system of FIG. 1, illustrating another exemplary method of providing the target features and the reference features from the target feature extractor and the reference feature extractor, respectively, to the quality assessor.
Figure 2C:
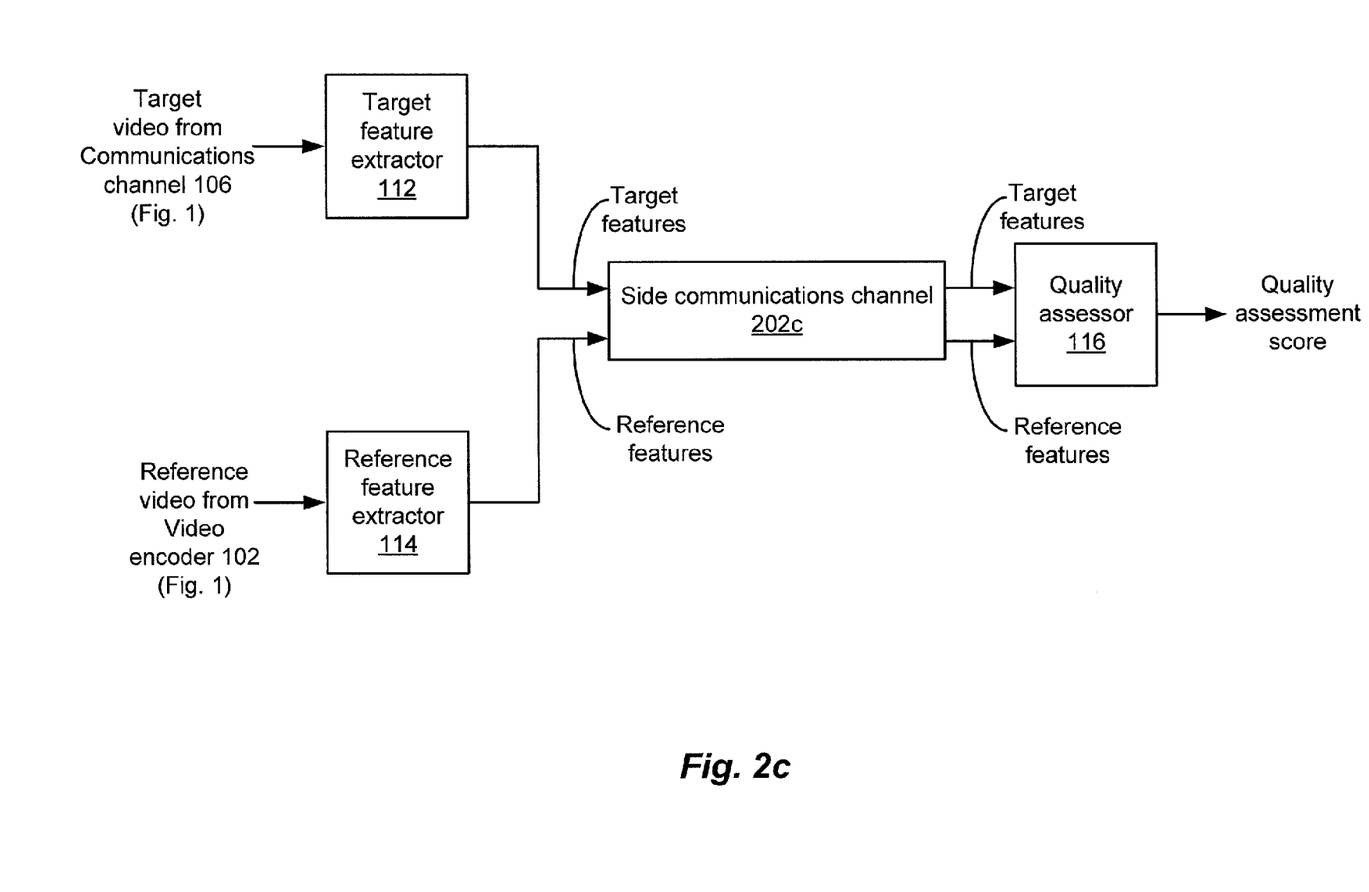
FIG. 2c is a block diagram of the exemplary target feature extractor, the exemplary reference feature extractor, and the exemplary quality assessor included within the system of FIG. 1, illustrating a further exemplary method of providing the target features and the reference features from the target feature extractor and the reference feature extractor, respectively, to the quality assessor.

FIGS. 2a-2c each depict an exemplary method of providing the target features and the reference features from the target feature extractor 112 and the reference feature extractor 114, respectively, to the quality assessor 116 (see also FIG. 1). As shown in FIG. 2a, the target feature extractor 112, the reference feature extractor 114, and the quality assessor 116 can be implemented in a distributed fashion within the video communications environment 100 such that the target feature extractor 112 is located proximate to or co-located with the quality assessor 116, such as within an endpoint device, and the reference feature extractor 114 is disposed at a distal or geographically remote location from the target feature extractor 112 and the quality assessor 116. For example, such an endpoint device can be a mobile phone, a mobile or non-mobile computer, a tablet computer, or any other suitable type of mobile or non-mobile endpoint device capable of displaying video. Further, the video quality measurement system 101 comprising the target feature extractor 112, the reference feature extractor 114, and the quality assessor 116 can operate to transmit the reference features from the reference feature extractor 114 at the distal or geographically remote location over at least one side communications channel 202a to the quality assessor 116, which, in turn, can access the target features from the target feature extractor 112 proximate thereto or co-located therewith for estimating the perceptual quality of the target video.

As shown in FIG. 2b, the target feature extractor 112, the reference feature extractor 114, and the quality assessor 116 can also be implemented in a distributed fashion within the video communications environment 100 such that the reference feature extractor 114 is located proximate to or co-located with the quality assessor 116, and the target feature extractor 112 is disposed at a distal or geographically remote location from the reference feature extractor 114 and the quality assessor 116. Further, the video quality measurement system 101 can operate to transmit the target features from the target feature extractor 112 at the distal or geographically remote location over at least one side communications channel 202b to the quality assessor 116, which, in turn, can access the reference features from the reference feature extractor 114 proximate thereto or co-located therewith for estimating the perceptual quality of the target video.

In addition, and as shown in FIG. 2c, the target feature extractor 112, the reference feature extractor 114, and the quality assessor 116 can be implemented in a distributed fashion within the video communications environment 100 such that the quality assessor 116 is disposed at a centralized location that is geographically remote from the target feature extractor 112 and the reference feature extractor 114. Further, the video quality measurement system 101 can operate to transmit the target features from the target feature extractor 112 over at least one side communications channel 202c to the quality assessor 116, and to transmit the reference features from the reference feature extractor 114 over the side communications channel 202c to the quality assessor 116, for estimating the perceptual quality of the target video within the quality assessor 116 at the geographically remote, centralized location. It is noted that the video quality measurement system 101 can operate to transmit the target features and the reference features to the quality assessor 116 over the same communications channel, or over different communications channels.

Having described the above illustrative embodiments of the video quality measurement system 101, other alternative embodiments or variations may be made. In accordance with one or more such alternative embodiments, the target feature extractor 112 and the reference feature extractor 114 can extract target features from the target video, and reference features from the reference video, respectively, by performing objective measurements with regard to the respective target and reference videos involving one or more additional temporal quality factors including, but not limited to, temporal quality factors relating to frame rates, video motion properties including jerkiness motion, frame dropping impairments, packet loss impairments, freezing impairments, and/or ringing impairments.

For example, taking into account the frame rate, in frames per second (fps), of the target video (also referred to herein as "$fps_{tar}$"), and the frame rate, in frames per second (fps), of the reference video (also referred to herein as "$fps_{ref}$"), the estimate of the predicted DMOS between the reference video and the target video, $\overline{\Delta Q}$, can be expressed in terms of a modified version of the second prediction function (see equation (3) above), as follows, $$\overline{\Delta Q} = f_2(\Delta blr, \Delta blk, \Delta fps), \quad (12)$$

in which "$\Delta blr$" corresponds to the average change in the blurriness measurements between the reference video and the target video for a predetermined segment from a corresponding time frame within the reference video and the target video, "$\Delta blk$" corresponds to the average change in the blockiness measurements between the reference video and the target video for the predetermined segment, and "$\Delta fps$" corresponds to the average change in the frame rates between the reference video and the target video, ($fps_{ref} - fps_{tar}$), for the predetermined segment. For example, the $\Delta fps$ can have a minimum bound at 0 (i.e., zero), such that there is essentially no penalty or benefit for the frame rate of the target video being higher than the frame rate of the reference video.

Accordingly, the quality assessor 116 can estimate the perceptual quality of the target video, $\hat{Q}_{tar}$ using a fourth prediction function based on the first prediction function, $f_1(QI_{ref})$ (see equation (2) above), and the modified second prediction function, $f_2(\Delta blr, \Delta blk, \Delta fps)$ (see equation (12) above). For example, the $\hat{Q}_{tar}$ can be expressed as $$\hat{Q}_{tar} = f_4(QI_{ref}, \Delta blr, \Delta blk, \Delta fps) = \\ a_4 \cdot QI_{ref} + b_4 \cdot \Delta blr + c_4 \cdot \Delta blk + d_4 \cdot \Delta fps + e_4 \quad (13)$$

in which "$f_4(QI_{ref}, \Delta blr, \Delta blk, \Delta fps)$" corresponds to the fourth prediction function, "$QI_{ref}$" corresponds to the QI for the reference video, and "$a_4$," "$b_4$," "$c_4$," "$d_4$," and "$e_4$" each correspond to a parameter coefficient of the fourth prediction function. For example, the value of each of the parameter coefficients $a_4$, $b_4$, $c_4$, $d_4$, and $e_4$ can be determined using a multi-variate linear regression approach, based on a plurality of predetermined target video bitstreams and their corresponding reference video bitstreams, and ground truth quality values, or any other suitable technique. For example, the parameter coefficients $a_4$, $b_4$, $c_4$, $d_4$, and $e_4$ may be determined or set to be equal to about 0.048, 0.19, 1.08, −0.044, and 5.23, respectively, or any other suitable values.

In accordance with one or more further alternative embodiments, the video encoder 102 may be omitted from the video communications environment 100, allowing the source video to take on the role of the reference video. In such a case, the estimate of the perceptual quality of the reference video, $\hat{Q}_{ref}$, is assumed to be fixed and known. Further, because the source video is assumed to have the highest perceptual quality, the $\hat{Q}_{ref}$ estimate now corresponds to the highest perceptual quality in comparison to at least the estimate of the perceptual quality of the target video, $\hat{Q}_{tar}$.

Accordingly, the quality assessor 116 can estimate the perceptual quality of the target video, $\hat{Q}_{tar}$, using a fifth prediction function based on the modified second prediction function, $f_2(\Delta blr, \Delta blk, \Delta fps)$ (see equation (12) above). For example, the $\hat{Q}_{tar}$ can be expressed as $$\hat{Q}_{tar} = f_5(\Delta blr, \Delta blk, \Delta fps) = a_5 \cdot \Delta blr + b_5 \cdot \Delta blk + c_5 \cdot \Delta fps + d_5, \quad (14)$$

in which "$f_5(\Delta blr, \Delta blk, \Delta fps)$" corresponds to the fifth prediction function, and "$a_5$," "$b_5$," "$c_5$," and "$d_5$" each correspond to a parameter coefficient of the fifth prediction function. For example, the value of each of the parameter coefficients $a_5$, $b_5$, $c_5$, and $d_5$ can be determined using a multi-variate linear regression approach, based on a plurality of predetermined target video bitstreams and their corresponding reference video bitstreams, and ground truth quality values, or any other suitable technique. It is noted that, in the fifth prediction function (see equation (14) above), the fixed, known estimate of the perceptual quality of the reference video, $\hat{Q}_{ref}$, can be incorporated into the parameter coefficient, $d_5$. For example, the parameter coefficients $a_5$, $b_5$, $c_5$, and $d_5$ may be determined or set to be equal to about 0.17, 1.81, −0.04, and 4.1, respectively, or any other suitable values.

In accordance with one or more additional alternative embodiments, taking into account the video motion properties of the target video, the $\overline{\Delta Q}$ can be expressed in terms of another modified version of the second prediction function (see equation (3) above), as follows, $$\overline{\Delta Q} = f_2(\Delta blr, \Delta blk, \hat{Q}_{tar\_temporal}), \quad (15)$$

in which "$\hat{Q}_{tar\_temporal}$" corresponds to an estimate of the perceptual quality of the target video for a predetermined segment from a corresponding time frame within the reference video and the target video, taking into account the video motion properties of the target video. For example, $\hat{Q}_{tar\_temporal}$ can be expressed as $$\hat{Q}_{tar\_temporal} = \frac{1 - e^{-d \frac{f_{tar}}{f_{max}}}}{1 - e^{-d}}, \quad (16)$$

in which "$f_{tar}$" corresponds to the frame rate of the target video, and "$f_{max}$" corresponds to a maximum frame rate. Further, in equation (16) above, "d" can be expressed as $$d = \alpha \cdot e^{\beta \cdot AMD}, \quad (17)$$

in which "α" and "β" are constants, and "AMD" is a temporal quality factor that can be obtained by taking the sum of absolute mean differences of pixel values in a block-wise fashion between consecutive video frames in the predetermined segment of the target video. For example, for video frames in the common intermediate format (CIF), the constants α and β may be set to be equal to about 9.412 and −0.1347, respectively, or any other suitable values. Further, for video frames in the video graphics array (VGA) format, the constants α and β may be set to be equal to about 8.526 and −0.0575, respectively, or any other suitable values. Moreover, for video frames in the high definition (HD) format, the constants α and β may be set to be equal to about 6.283 and −0.1105, respectively, or any other suitable values.

Accordingly, the quality assessor 116 can estimate the perceptual quality of the target video, $\hat{Q}_{tar}$, using a sixth prediction function based on the modified second prediction function, $f_2(\Delta blr, \Delta blk, \hat{Q}_{tar\_temporal})$ (see equation (15) above). For example, the $\hat{Q}_{tar}$ can be expressed as $$\hat{Q}_{tar} = f_6(\Delta blr, \Delta blk, \hat{Q}_{tar\_temporal}) = \qquad (18)$$
$$a_6 \cdot \Delta blr + b_6 \Delta blk + c_6 \hat{Q}_{tar\_temporal} + d_6,$$

in which "$f_6(\Delta blr, \Delta blk, \hat{Q}_{tar\_temporal})$" corresponds to the sixth prediction function, and "$a_6$," "$b_6$," "$c_6$," and "$d_6$" each correspond to a parameter coefficient of the sixth prediction function. For example, the value of each of the parameter coefficients $a_6$, $b_6$, $c_6$, and $d_6$ can be determined using a multi-variate linear regression approach, based on a plurality of predetermined target video bitstreams and their corresponding reference video bitstreams, and ground truth quality values, or any other suitable technique. For example, the parameter coefficients $a_6$, $b_6$, $c_6$, and $d_6$ may be determined or set to be equal to about 0.18, 1.74, 2.32, and 1.66, respectively, or any other suitable values.

In accordance with one or more further alternative embodiments, taking into account the frame dropping impairments of the target video, the $\overline{\Delta Q}$ can be expressed in terms of still another modified version of the second prediction function (see equation (3) above), as follows, $$\overline{\Delta Q} = f_2(\Delta blr, \Delta blk, NIFVQ(fps_{tar})), \qquad (19)$$

in which "$NIFVQ(fps_{tar})$" is a temporal quality factor representative of the negative impact of such frame dropping impairments on the perceptual quality of the target video for a predetermined segment from a corresponding time frame within the reference video and the target video, and "$fps_{tar}$" corresponds to the frame rate of the target video, for a current video frame in the predetermined segment. For example, $NIFVQ(fps_{tar})$ can be expressed as $$NIFVQ(fps_{tar}) = [\log(30) - \log(fps_{tar})] \qquad (20)$$

or $$NIFVQ(fps_{tar}) = AMD * [\log(30) - \log(fps_{tar})], \qquad (21)$$

in which "AMD" is the temporal quality factor that can be obtained by taking the sum of block-wise absolute mean differences of pixel values in a block-wise fashion between consecutive video frames in the predetermined segment of the target video. It is noted that in the exemplary equations (20) and (21) above, it has been assumed that the maximum frame rate of the reference video is 30 frames per second.

Accordingly, the quality assessor 116 can estimate the perceptual quality of the target video, $\hat{Q}_{tar}$, using a seventh prediction function based on the modified second prediction function, $f_2(\Delta blr, \Delta blk, NIFVQ(fps_{tar}))$ (see equation (19) above). For example, the $\hat{Q}_{tar}$ can be expressed as $$\hat{Q}_{tar} = f_7(\Delta blr, \Delta blk, NIFVQ(fps_{tar})) = \qquad (22)$$
$$a_7 \cdot \Delta blr + b_7 \cdot \Delta blk + c_7 \cdot NIFVQ(fps_{tar}) + d_7,$$

in which "$f_7(\Delta blr, \Delta blk, NIFVQ(fps_{tar}))$" corresponds to the seventh prediction function, and "$a_7$," "$b_7$," "$c_7$," and "$d_7$" each correspond to a parameter coefficient of the seventh prediction function. For example, the value of each of the parameter coefficients $a_7$, $b_7$, $c_7$, and $d_7$ can be determined using a multi-variate linear regression approach, based on a plurality of predetermined target video bitstreams and their corresponding reference video bitstreams, and ground truth quality values, or any other suitable technique. For example, in the event the temporal quality factor, $NIFVQ(fps_{tar})$, is determined using equation (20) above, the parameter coefficients $a_7$, $b_7$, $c_7$, and $d_7$ may be determined or set to be equal to about 0.17, 1.82, −0.68, and 4.07, respectively, or any other suitable values. Further, in the event the temporal quality factor, $NIFVQ(fps_{tar})$, is determined using equation (21) above, the parameter coefficients $a_7$, $b_7$, $c_7$, and $d_7$ may be determined or set to be equal to about 0.18, 1.84, −0.02, and 3.87, respectively, or any other suitable values.

In accordance with one or more additional alternative embodiments, taking into account the jerkiness motion in the target video, the $\overline{\Delta Q}$ can be expressed in terms of yet another modified version of the second prediction function (see equation (3) above), as follows, $$\overline{\Delta Q} = f_2(\Delta blr, \Delta blk, JM), \qquad (23)$$

in which "JM" is a temporal quality factor representative of a jerkiness measurement performed with regard to the target video for a predetermined segment from a corresponding time frame within the reference video and the target video. For example, JM can be expressed as $$JM = \frac{30}{fps_{tar}} * \sqrt{\frac{1}{MN} \sum_{x=1}^{M} \sum_{y=1}^{N} |f_i(x,y) - f_{i-1}(x,y)|} \qquad (24)$$

in which "$fps_{tar}$" is the frame rate of the target video, "M" and "N" are the dimensions of each video frame in the target video, and "$|f_i(x,y) - f_{i-1}(x,y)|$" represents the direct frame difference between consecutive video frames at times "i" and "i−1" in the target video. It is noted that the temporal quality factor, AMD, may be similar to the direct frame difference, $|f_i(x,y) - f_{i-1}(x,y)|$, employed in equation (24) above. The temporal quality factor, JM, can therefore be alternatively expressed in terms of the AMD as follows, $$JM = \frac{30}{fps_{tar}} * AMD \qquad (25)$$

Accordingly, the quality assessor 116 can estimate the perceptual quality of the target video, $\hat{Q}_{tar}$, using an eighth prediction function based on the modified second prediction function, $f_2(\Delta blr, \Delta blk, JM)$ (see equation (23) above). For example, the $\hat{Q}_{tar}$ can be expressed as $$\hat{Q}_{tar} = f_7(\Delta blr, \Delta blk, JM) = a_8 \Delta blr + b_8 \Delta blk + c_8 JM + d_8, \qquad (26)$$

in which "$f_7(\Delta blr, \Delta blk, JM)$" corresponds to the eighth prediction function, and "$a_8$," "$b_8$," "$c_8$," and "$d_8$" each correspond to a parameter coefficient of the eighth prediction function. For example, the value of each of the parameter coefficients $a_8$, $b_8$, $c_8$, and $d_8$ can be determined using a multi-variate linear regression approach, based on a plurality of predetermined target video bitstreams and their corresponding reference video bitstreams, and ground truth quality values, or any other suitable technique. For example, the parameter coefficients $a_8$, $b_8$, $c_8$, and $d_8$ may be set to be equal to about 0.19, 1.92, −0.006, and 3.87, respectively, or any other suitable values.

Figure 3:
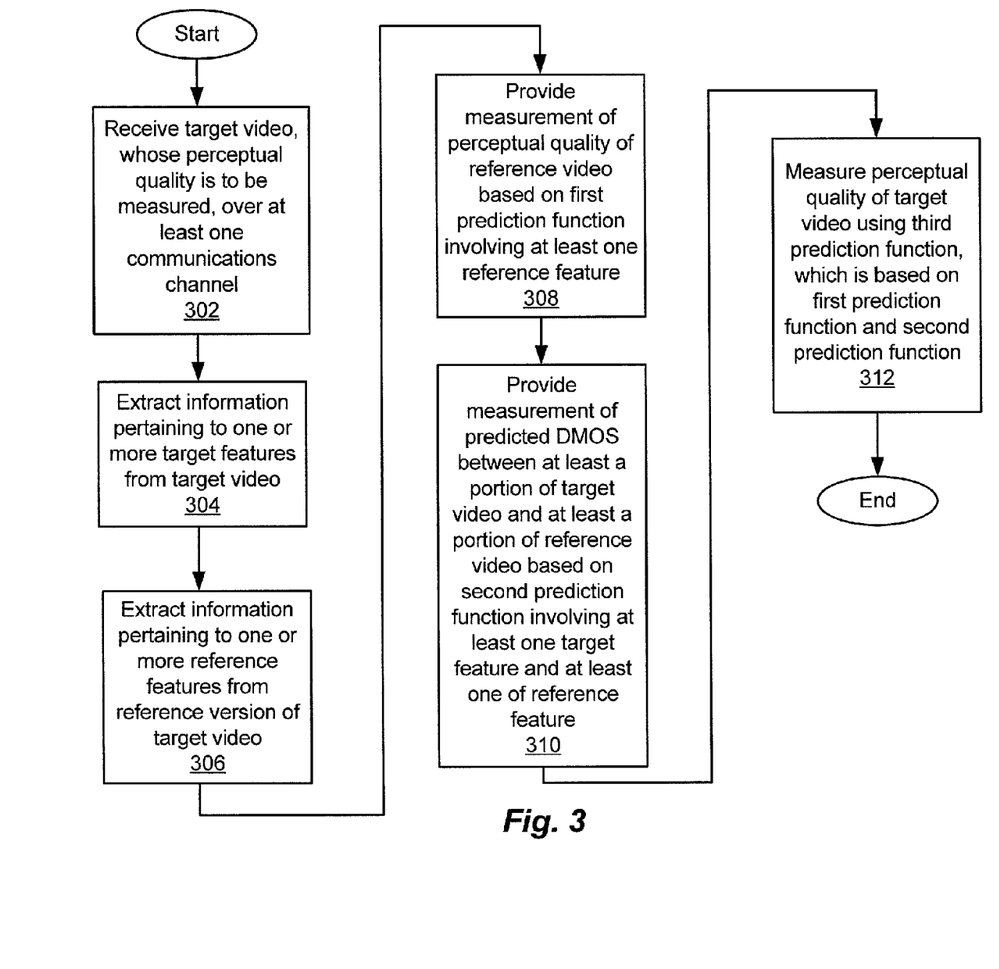
FIG. 3 is a flow diagram of an exemplary method of operating the system of FIG. 1.

An illustrative method of operating the video quality measurement system 101 of FIG. 1 is described below with reference to FIG. 3, as well as FIG. 1. As depicted in step 302, a target video whose perceptual quality is to be measured is received over at least one communications channel. As depicted in step 304, information pertaining to one or more target features is extracted from the target video by the target feature extractor 112 (see FIG. 1). As depicted in step 306, information pertaining to one or more reference features is extracted from a reference version of the target video by the reference feature extractor 114 (see FIG. 1). As depicted in step 308, a measurement of the perceptual quality of the reference video is provided, by the quality assessor 116 (see FIG. 1), based on a first prediction function for a predetermined segment from a corresponding time frame within the target video and the reference video, wherein the first prediction function involves at least one of the reference features. As depicted in step 310, a measurement of a predicted differential mean opinion score (DMOS) between at least a portion of the target video and at least a portion of the reference video is provided, by the quality assessor 116, based on a second prediction function for the predetermined segment, wherein the second prediction function involves at least one of the target features and at least one of the reference features. As depicted in step 312, the perceptual quality of the target video is measured using a third prediction function for the predetermined segment, wherein the third prediction function is based on the first prediction function and the second prediction function.

It is noted that the operations depicted and/or described herein are purely exemplary, and imply no particular order. Further, the operations can be used in any sequence, when appropriate, and/or can be partially used. With the above illustrative embodiments in mind, it should be understood that such illustrative embodiments can employ various computer-implemented operations involving data transferred or stored in computer systems. Such operations are those requiring physical manipulation of physical quantities. Typically, though not necessarily, such quantities take the form of electrical, magnetic, and/or optical signals capable of being stored, transferred, combined, compared, and/or otherwise manipulated.

Further, any of the operations depicted and/or described herein that form part of the illustrative embodiments are useful machine operations. The illustrative embodiments also relate to a device or an apparatus for performing such operations. The apparatus can be specially constructed for the required purpose, or can be a general-purpose computer selectively activated or configured by a computer program stored in the computer. In particular, various general-purpose machines employing one or more processors coupled to one or more computer readable media can be used with computer programs written in accordance with the teachings disclosed herein, or it may be more convenient to construct a more specialized apparatus to perform the required operations.

The presently disclosed systems and methods can also be embodied as computer readable code on a computer readable medium. The computer readable medium is any data storage device that can store data, which can thereafter be read by a computer system. Examples of such computer readable media include hard drives, read-only memory (ROM), random-access memory (RAM), CD-ROMs, CD-Rs, CD-RWs, magnetic tapes, and/or any other suitable optical or non-optical data storage devices. The computer readable media can also be distributed over a network-coupled computer system, so that the computer readable code can be stored and/or executed in a distributed fashion.

The foregoing description has been directed to particular illustrative embodiments of this disclosure. It will be apparent, however, that other variations and modifications may be made to the described embodiments, with the attainment of some or all of their associated advantages. Moreover, the procedures, processes, and/or modules described herein may be implemented in hardware, software, embodied as a computer-readable medium having program instructions, firmware, or a combination thereof. For example, the functions described herein may be performed by a processor executing program instructions out of a memory or other storage device.

It will be appreciated by those skilled in the art that modifications to and variations of the above-described systems and methods may be made without departing from the inventive concepts disclosed herein. Accordingly, the disclosure should not be viewed as limited except as by the scope and spirit of the appended claims.

What is claimed is:

1. A method of measuring perceptual quality of video, the video being provided over at least one communications channel, the method comprising the steps of:
   receiving a target video over the at least one communications channel;
   extracting, from the target video, objective information pertaining to one or more target features of the target video;
   receiving objective information pertaining to one or more reference features of a reference version of the target video, wherein one or more reference features correspond, respectively, to the one or more target features;
   providing an objective measurement of perceptual quality of the reference version of the target video based at least on the objective information pertaining to the one or more reference features;
   providing an objective measurement of a predicted differential mean opinion score (DMOS) between at least a portion of the target video and at least a corresponding portion of the reference version of the target video based at least on the objective information pertaining to the one or more reference features and the information pertaining to the one or more target features; and
   providing an objective measurement of perceptual quality of the target video, the providing of the objective measurement of perceptual quality of the target video including obtaining a difference between the objective measurement of perceptual quality of the reference version of the target video, and the objective measurement of the predicted DMOS between at least the corresponding portion of the target video and at least the portion of the reference version of the target video.

2. The method of claim 1 wherein providing the objective measurement of perceptual quality of the target video is based at least on one or more prediction functions, each of the one or more prediction functions being a function of one or more of the objective information pertaining to the one or more reference features and the objective information pertaining to the one or more corresponding target features.

3. The method of claim 2 wherein providing the objective measurement of perceptual quality of the target video is based at least on the one or more prediction functions, each of the one or more prediction functions pertaining to a predetermined segment from a corresponding time frame within the target video and the reference version of the target video.

4. The method of claim 2 wherein at least one of the one or more prediction functions is a function of at least one or more objective measurements performable with regard to the target video and the reference version of the target video, and wherein the providing of the objective measurement of perceptual quality of the target video comprises:
   normalizing the one or more objective measurements to reflect differences in resolution between the target video and the reference version of the target video.

5. The method of claim 1 wherein the providing of the objective measurement of perceptual quality of the reference version of the target video comprises:
   setting the measurement of perceptual quality of the reference version of the target video to a predetermined constant value.

6. The method of claim 1 wherein providing the objective measurement of perceptual quality of the reference version of the target video is based at least on a first prediction function for a predetermined segment from a corresponding time frame within the target video and the reference version of the target video.

7. The method of claim 6 wherein the first prediction function is a function of at least a quantization index for the reference version of the target video.

8. The method of claim 7 wherein the quantization index corresponds to one of a quantization parameter and a quantization scale for the reference version of the target video.

9. The method of claim 8 wherein the quantization parameter corresponds to the H.264 video coding format.

10. The method of claim 8 wherein the quantization scale corresponds to the MPEG-2 video coding format.

11. The method of claim 6 wherein providing the measurement of the predicted DMOS between at least the portion of the target video and at least the portion of the reference version of the target video is based at least on a second prediction function for the predetermined segment from the corresponding time frame within the target video and the reference version of the target video.

12. The method of claim 11 wherein the second prediction function is a function of one or more of (a) an objective measurement of blur in the target video and an objective measurement of blur in the reference version of the target video, (b) an objective measurement of blocking artifacts in the target video and an objective measurement of blocking artifacts in the reference version of the target video, (c) a frame rate for the target video and a frame rate for the reference version of the target video, (d) video motion properties of the target video, (e) frame dropping impairments of the target video, (f) packet loss impairments of the target video, (g) frame freezing impairments of the target video, and (h) ringing impairments of the target video.

13. The method of claim 12 wherein the second prediction function is a linear prediction function.

14. The method of claim 12 wherein the video motion properties include jerkiness motion properties of the target video.

15. The method of claim 11 wherein the providing of the measurement of perceptual quality of the target video comprises:
   measuring the perceptual quality of the target video using a third prediction function for the predetermined segment from the corresponding time frame within the target video and the reference version of the target video, the third prediction function being based at least on the first prediction function and the second prediction function.

16. The method of claim 1 wherein the extracting of the information pertaining to the one or more target features of the target video comprises:
   performing one or more objective measurements with regard to the target video, the one or more objective measurements including one or more of (a) objective measurements of blur in the target video, (b) objective measurements of blocking artifacts in the target video, and (c) objective measurements of an average quantization index for the target video.

17. The method of claim 1 further comprising:
   extracting, from the reference version of the target video, the objective information pertaining to the one or more reference features of the reference version of the target video.

18. The method of claim 17 wherein the extracting of the information pertaining to the one or more reference features of the reference version of the target video comprises:
   performing one or more objective measurements with regard to the reference version of the target video, the one or more objective measurements including one or more of (a) objective measurements of blur in the reference version of the target video, (b) objective measurements of blocking artifacts in the reference version of the target video, and (c) objective measurements of an average quantization index for the reference version of the target video.

19. The method of claim 17 wherein the extracting of the information pertaining to the one or more target features of the target video comprises:
   performing an objective measurement of blur in the target video, and
   wherein the extracting of the information pertaining to the one or more reference features of the reference version of the target video comprises:
   performing an objective measurement of blur in the reference version of the target video.

20. The method of claim 19 wherein the providing of the measurement of perceptual quality of the target video comprises:
   normalizing the objective measurement of blur in the target video; and
   normalizing the objective measurement of blur in the reference version of the target video, thereby reflecting differences in resolution between the target video and the reference version of the target video.

21. The method of claim 2 wherein at least one of the one or more prediction functions includes a plurality of parameter coefficients, and wherein the method further comprises:
   determining the plurality of parameter coefficients using at least a multi-variate linear regression technique.

22. The method of claim 2 wherein at least one of the one or more prediction functions is a function of one or more of (a) an average change between a measurement of blur in the target video and a measurement of blur in the reference version of the target video, (b) an average change between a measurement of blocking artifacts in the target video and a measurement of blocking artifacts in the reference version of the target video, (c) an average change between a frame rate for the target video and a frame rate for the reference version of the target video, (d) video motion properties of the target video, (e) frame dropping impairments of the target video, (f) packet loss impairments of the target video, (g) frame freezing impairments of the target video, and (h) ringing impairments of the target video.

23. The method of claim 22 wherein at least one of the one or more prediction functions is a linear prediction function.

24. A video quality measurement system, comprising:
a target feature extractor operative to extract, from a target video, objective information pertaining to one or more target features of the target video; and
a quality assessor operative:
to receive objective information pertaining to one or more reference features of a reference version of the target video, wherein the one or more reference features correspond, respectively, to the one or more target features;
to provide an objective measurement of perceptual quality of the reference version of the target video based at least on the objective information pertaining to the one or more reference features;
to provide an objective measurement of a predicted differential mean opinion score (DMOS) between at least a portion of the target video and at least a corresponding portion of the reference version of the target video based at least on the objective information pertaining to the one or more reference features and the objective information pertaining to the one or more target features; and
to obtain an objective measurement of perceptual quality of the target video as a function of a difference between the objective measurement of perceptual quality of the reference version of the target video, and the measurement of the predicted DMOS between at least the portion of the target video and at least the corresponding portion of the reference version of the target video.

25. The system of claim 24 wherein the quality assessor is further operative to provide the objective measurement of perceptual quality of the target video based at least on one or more prediction functions, each of the one or more prediction functions being a function of one or more of the objective information pertaining to the one or more target features and the objective information pertaining to the corresponding one or more reference features.

26. The system of claim 25 wherein the quality assessor is further operative to provide the objective measurement of perceptual quality of the target video based at least on the one or more prediction functions, each of the one or more prediction functions pertaining to a predetermined segment from a corresponding time frame within the target video and the reference version of the target video.

27. The system of claim 25 wherein at least one of the one or more prediction functions is a function of at least one or more objective measurements performable with regard to the target video and the reference version of the target video, and wherein the quality assessor is further operative to normalize the one or more objective measurements to reflect differences in resolution between the target video and the reference version of the target video.

28. The system of claim 25 wherein at least one of the one or more prediction functions is a function of one or more of (a) an average change between a measurement of blur in the target video and a measurement of blur in the reference version of the target video, (b) an average change between a measurement of blocking artifacts in the target video and a measurement of blocking artifacts in the reference version of the target video, (c) an average change between a frame rate for the target video and a frame rate for the reference version of the target video, (d) video motion properties of the target video, (e) frame dropping impairments of the target video, (f) packet loss impairments of the target video, (g) frame freezing impairments of the target video, and (h) ringing impairments of the target video.

29. The system of claim 28 wherein at least one of the one or more prediction functions is a linear prediction function.

30. A distributed system for measuring perceptual quality of video, the video having one or more features, the one or more features of the video being provided over at least one communications channel, the system comprising:
a target feature extractor operative to extract, from a target video whose perceptual quality is to be measured, objective information pertaining to one or more target features of the target video;
a reference feature extractor operative to extract, from a reference version of the target video, objective information pertaining to one or more reference features of the target video wherein one or more reference features corresponds respectfully to the one or more target features; and
a quality assessor that is geographically remote from the target feature extractor and the reference feature extractor, the quality assessor being operative:
to receive the objective information pertaining to the one or more target features from the target feature extractor over the at least one communications channel;
to receive the objective information pertaining to the one or more reference features from the reference feature extractor over the at least one communications channel;
to provide an objective measurement of a predicted differential mean opinion score (DMOS) between at least a portion of the target video and at least a corresponding portion of the reference version of the target video based at least on the objective information pertaining to the one or more reference features and the objective information pertaining to the one or more target features; and
to obtain an objective measurement of perceptual quality of the target video as a function of a difference between the objective measurement of perceptual quality of the reference version of the target video, and the measurement of the predicted DMOS between at least the portion of the target video and at least the corresponding portion of the reference version of the target video.

31. The system of claim 30 wherein the quality assessor is further operative:
to provide the objective measurement of perceptual quality of the target video based at least on one or more prediction functions involving the objective information pertaining to one or more target features and the one or more reference features.

32. A distributed system for measuring perceptual quality of video, the video having one or more features, the one or more features of the video being provided over at least one communications channel, the system comprising:
a target feature extractor operative to extract, from a target video whose perceptual quality is to be measured, objective information pertaining to one or more target features of the target video;
a reference feature extractor operative to extract, from a reference version of the target video, objective information pertaining to one or more reference features of the target video wherein the one or more reference features correspond, respectively, to the one or more target features; and a quality assessor that is co-located with the reference feature extractor and geographically remote from the target feature extractor, the quality assessor being operative:

to receive the objective information pertaining to the one or more reference features from the reference feature extractor;

to receive the objective information pertaining to the one or more target features from the target feature extractor over the at least one communications channel;

to provide an objective measurement of a predicted differential mean opinion score (DMOS) between at least a portion of the target video and at least a corresponding portion of the reference version of the target video based at least on the objective information pertaining to the one or more reference features and the objective information pertaining to the one or more target features; and to obtain an objective measurement of perceptual quality of the target video as a function of a difference between the objective measurement of perceptual quality of the reference version of the target video, and the measurement of the predicted DMOS between at least the portion of the target video and at least the corresponding portion of the reference version of the target video.

33. The system of claim 32 wherein the quality assessor is further operative to provide the objective measurement of perceptual quality of the target video based at least on one or more prediction functions involving the objective information pertaining to the one or more target features and the one or more reference features.

* * * * *